US005432905A

United States Patent [19]

Hsieh et al.

[11] Patent Number: 5,432,905

[45] Date of Patent: Jul. 11, 1995

[54] ADVANCED ASYNCRONOUS VIDEO ARCHITECTURE

[75] Inventors: Minjhing Hsieh; Edward P. Hutchins, both of San Jose, Calif.

[73] Assignee: Chips and Technologies, Inc., San Jose, Calif.

[21] Appl. No.: 194,544

[22] Filed: Feb. 10, 1994

Related U.S. Application Data

[63] Continuation of Ser. No. 590,222, Sep. 28, 1990, abandoned.

[51] Int. Cl.[6] .............................................. G06F 15/66

[52] U.S. Cl. .............................................. 395/162

[58] Field of Search .............................. 395/162, 164; 364/200 MS File, 900 MS File; 345/197, 198, 204, 205

[56] References Cited

U.S. PATENT DOCUMENTS

| | | | |
|---|---|---|---|
| 4,569,019 | 2/1986 | DiOrio et al. | 364/410 |
| 4,905,189 | 2/1990 | Brunolli | 364/900 |
| 4,991,111 | 2/1991 | Crookshanks | 364/518 |
| 5,148,523 | 9/1992 | Harlin et al. | 395/164 |

*Primary Examiner*—Phu K. Nguyen
*Attorney, Agent, or Firm*—Benman Collins & Sawyer

[57] ABSTRACT

An asynchronous video system provides for the appropriate pixel data to be displayed. The system maps display control signals into a memory clock while maintaining the appropriate relationship with pixel data. Therefore, the display control signals are generated using the memory clock. Hence, no synchronization circuit is necessary to ensure that the memory control circuit and display control circuit are running at the same frequency.

22 Claims, 3 Drawing Sheets

10

ADVANCED ASYNCRONOUS VIDEO ARCHITECTURE

This is a continuation of application Ser. No. 07/590,22 filed on Sep. 28, 1990, now abandoned.

The present invention relates to an asynchronous video controller system. More particularly, the present invention relates to a system for providing video and display control signals for a raster display device using asynchronous clocks.

BACKGROUND OF THE INVENTION

The present invention pertains to the environment of a raster display system. Raster display device has been the main visual information presentation device in the information industry. It is defined here as a display device in which picture elements (pixel data) are presented to the screen in a fixed scanning order. The order can be repetition of left to right for a line and top to bottom for one screen or the other combinations as long as it is fixed in a particular system. Same scanning order can also happen in several sections of the screen alternatively or simultaneously. Thus the raster display device referred to in this invention includes CRT monitor and flat panels such as liquid crystal display (LCD), electroluminant display (ELD), and plasma display. Video controller designs for raster display system use either a synchronous or asynchronous clock for the three major functions—video memory control, video pixel processing, and video display control. Using a synchronous clock—that is, the same clock for the three major functions—the memory performance is limited and, in addition, design flexibility is significantly impaired.

Hence, to improve the designs, at least two asynchronous clocks have been used. In these types of systems, the video memory runs at a different frequency than the video processing circuit and display control circuit. In all previously known asynchronous video designs, the display control signals, for example, HSYNC, VSYNC, BLANK, DISPEN (DISPLAY ENABLE) and CURSON (TEXT CURSOR ON), are on the video clock side because they need to be synchronous to video pixel processing. Video pixel information is fetched from the video memory using memory clock. The problem with previously known asynchronous systems has been the need for the synchronization circuit between the memory control circuit and the display control circuit to coordinate the complex events happening in these two circuits running at different frequencies. This type of synchronization circuit is very complex and its functional reliability has been a main design problem in the prior asynchronous video architecture. What is required is a video controller design in which the limitation above described with synchronous systems such as memory performance and design flexibility are eliminated and, at the same time, the synchronization circuit design problems associated with such asynchronous systems are removed.

SUMMARY OF THE INVENTION

The present invention comprises an asynchronous video controller system which includes a memory clock and a video clock. The system comprises of memory which contains pixel data and a video controller circuit for controlling pixel data fetched from the video memory. It also includes means for providing a plurality of raster display control signals. A First In First Out (FIFO) circuit is used for receiving the pixel data and the raster display control signals responsive to the memory clock. A video processing circuit for processing the video signals receives the video display control signals and the pixel data from the FIFO responsive to the video clock.

Through the use of this system, advanced raster display control signals are provided. By mapping the display control signals into memory clock, while maintaining the relationship with pixel data, the raster display control signals are generated on the memory side using the memory clock instead of the video clock. Hence, there is no need for a synchronization circuit as is known in the prior art for asynchronous systems. The complex design problems associated with the synchronization circuit to handshake between the raster display control circuit and the memory control circuit running at different frequencies are thus completely eliminated.

DETAILED DESCRIPTION OF THE DRAWINGS

The present invention relates to an improvement in the generation of video signals in an asynchronous video system. The following description is presented to enable one of ordinary skill in the art to make and use the invention as provided in the context of a patent application and its requirements. Various modifications to the preferred embodiment will be readily apparent to those skilled in the art, and the generic principles defined herein may be applied to other embodiments. Thus, the present invention is not intended to be limited to the refinements shown, but is to be accorded the widest scope consistent with the principles and novel features disclosed herein.

Figure 1:
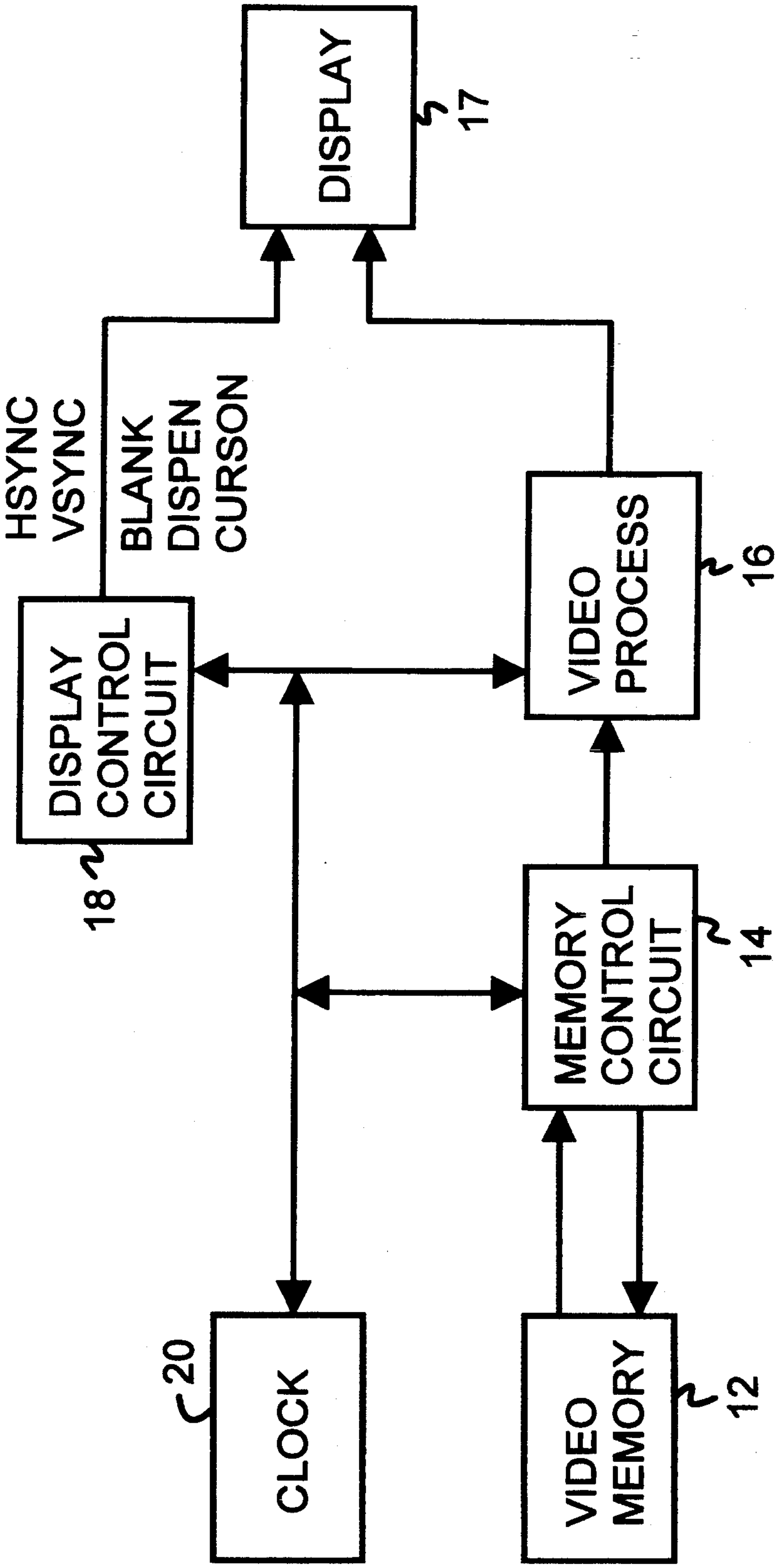
FIGURE 1 PRIOR ART
FIG. 1 is a block diagram of a synchronous video control system according to the prior art.

Referring now to FIG. 1, what is shown is a synchronous video system 10 which includes video memory 12, which is coupled to a memory control circuit 14, which in turn is coupled to a video processing circuit 16. Coupled to the Video processing circuit 16, also, is a display control circuit 18 which provides control signals for a raster display device 17 to operate properly. The display 17 can be of any form of raster display device including CRT monitor and a variety of flat panel devices such as liquid crystal display (LCD), electroluminant display (ELD), plasma display.

Some examples taken from the CRT display control signal are: HSYNC, VSYNC, BLANK, DISPEN and CURSON. HSYNC stands for horizontal synchronization. It is used to tell the raster scanning operation when to retrace horizontally to the beginning of the horizontal line. VSYNC stands for vertical synchronization and it tells the raster operation when to retrace vertically to the top (beginning) of the display screen. BLANK tells the display device when to turn off the display. DISPEN stands for display enable and it tells the display device when to turn on the display. CURSON stands for cursor on and it tells the video processing circuit when to generate cursor video for text character.

Together with the raster display control signals, pixel data generated from the video processing circuit 16 is sent to display device 17 to tell what pixel value to display. The video processing circuit 16 processes the pixel data fetched from the video memory 12. As is seen, a single clock signal from clock 20 is provided to the memory control circuit 14, the video process circuit 16 and the display control circuit 18 to ensure that three major functions are operating simultaneously. The relationship between the three control circuits is easily maintained by using the same clock source. As has been before described, this type of circuit, although simple in design, provides for very limited system performance because design flexibility is restricted by the single clock.

Figure 2:
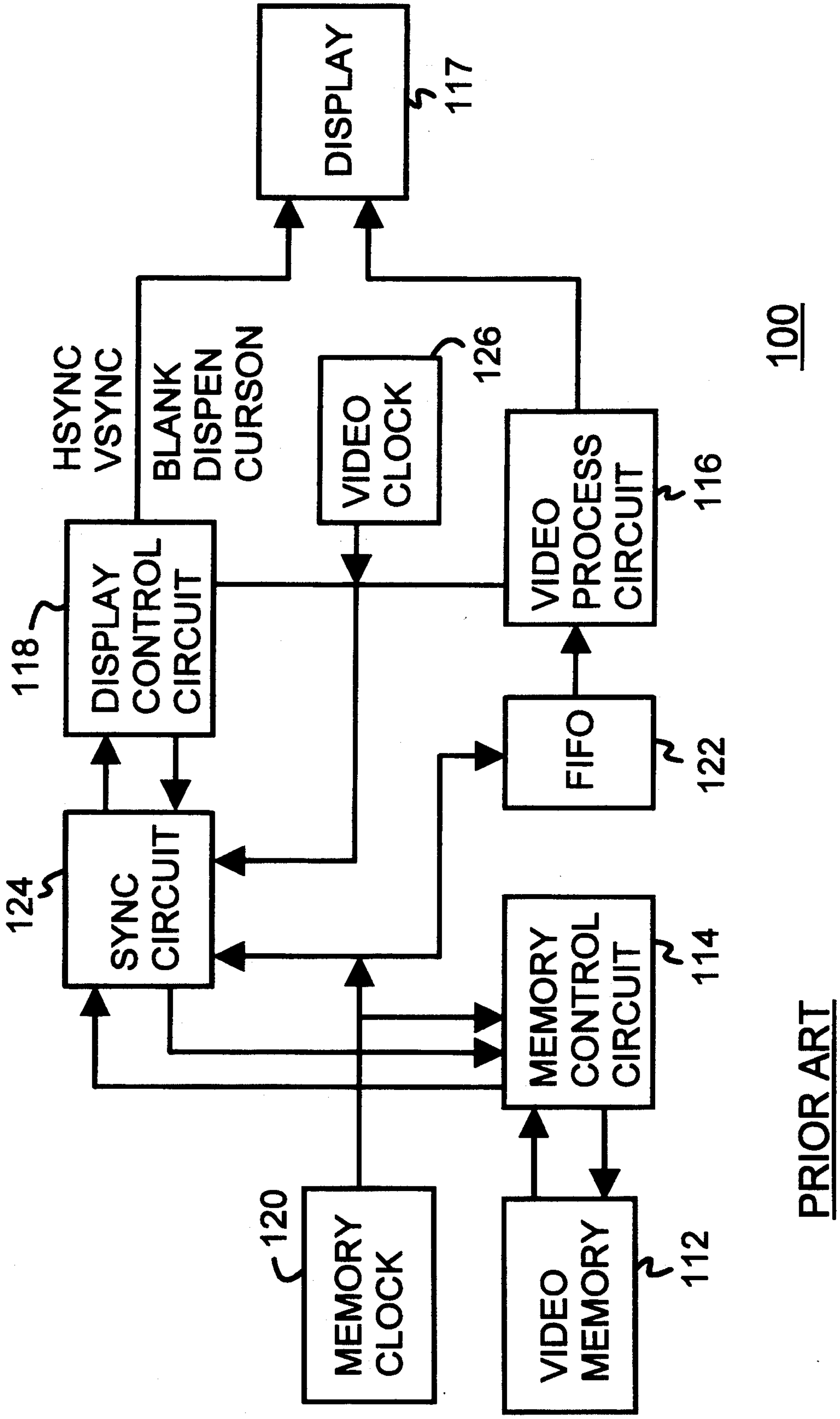
FIGURE 2 PRIOR ART
FIG. 2 is a block diagram of an asynchronous video control system according to the prior art.

FIG. 2 describes a typical asynchronous video system 100 as known in the prior art. This system 100 contains many of the same elements as those above described—for example, video memory 112, memory control circuit 114, video process circuit 116, display control circuit 118 and a display device 117. It also includes three additional elements: a video clock 126, a FIFO 122, and a synchronization circuit 124.

There are two clocks for such a system—the memory clock 120 which is used to fetch video data from the video memory 112 via memory control circuit 114 and FIFO 122, and a video clock 126 which provides the clocking signal to display control circuit 118 and video processing circuit 116. FIFO 122 is used between memory control circuit 114 and video processing circuit 116 to temporarily buffer the pixel data. Synchronization circuit 124 is used between the memory control circuit 114 and the display control circuit 118.

A major design issue for such an asynchronous approach is the need for the synchronization circuit 124. To gain the memory performance, the memory control circuit 114 is running at different frequency than the display control circuit 118 and the video processing circuit 116. However, the relationship between the display control circuit 118 and the memory control circuit 114 needs to be maintained in order to fetch and generate the pixel data at the right time frame relative to the raster scanning position so that correct image can be generated on the display device at the right time. It is the responsibility of the synchronization circuit 124 to coordinate and maintain the right relationship between these two control circuits which run at different frequencies. The correct relationship needs to be maintained under all possible operational conditions. Reliable design of such complex synchronization circuit 124 is a major issue.

The present invention provides a completely different architecture for this asynchronous system that eliminates the need for the synchronization circuit and, therefore, entirely eliminates the design problems associated with it.

Figure 3:
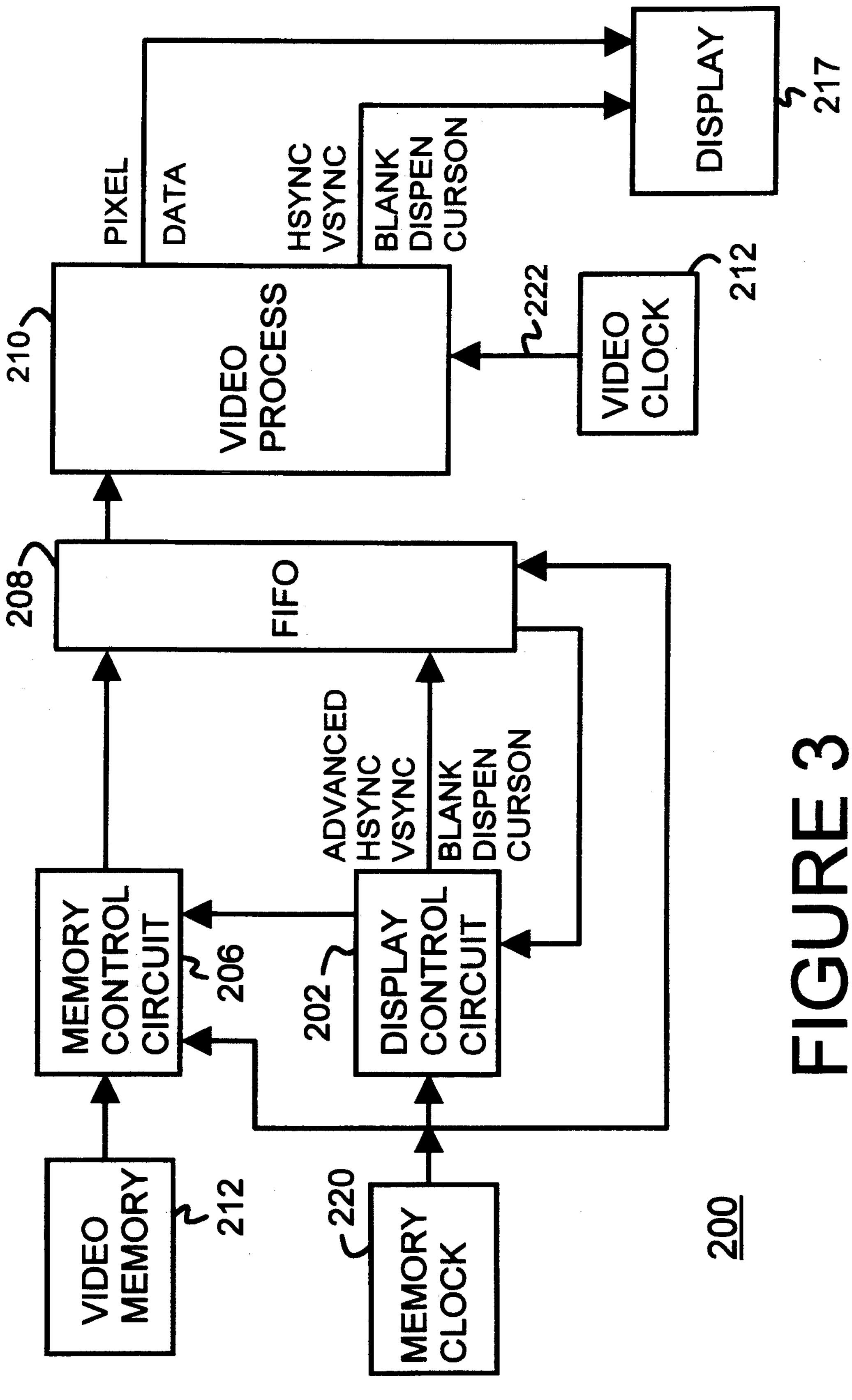
FIG. 3 is a block diagram of an asynchronous video control system in accordance with the present invention.

Referring to FIG. 3, as is seen, in the asynchronous video system 200 of the present invention, a video memory 204 is controlled by the memory control circuit 206, which feeds pixel data to a FIFO 208. The display control circuit 202 is now on the memory side of the FIFO 208 rather than on the video side. Hence, in this embodiment, the same clock signal 220 from memory clock 204 is used to control the information in both the display control circuit 202 and the memory control circuit 206. In the use of this system, as above described, the memory clock 220 is utilized to generate memory control signals such as RAS, CAS, WE and memory address and data bus. These signals are used to control the memory operations such as READ cycle, WRITE cycle, and REFRESH cycle, etc and get the pixel data from the memory. The video memory can be of any type, such as static RAM, dynamic RAM, or video RAM.

The memory clock signal 220 is also used to provide what is termed advanced display control signals. These advanced version of raster display control signals are generated before they are actually processed on the video side of the system. In this embodiment, the display control signals are mapped into the memory clock time frame and their relationship with the pixel data is locked by the memory cycles using the same clock signals. The pixel data and advanced display control signals together are then provided to the FIFO 208 which, in turn, feeds both of the above mentioned signals to the video process circuit 210. The video process circuit 210 then is clocked by the video clock 212 via line 222 to ensure that both the pixel data and the display control signals are sent to the display device 217 at the proper time.

Hence, through the present architecture, the design of the boundary between the memory section and the video section is simplified. Since the memory section and the video section can run independently by different clocks, the system design is very flexible and the system performance can be optimized by selecting the proper clock frequency for each section. Also, since no synchronization circuit is required, this system eliminates all the design issues associated with such a circuit.

One of ordinary skill in the art will recognize that all of the elements shown can be implemented in a variety of ways and those implementations would be within the spirit and scope of the present invention. It should also be recognized that the five advanced display control signals mentioned are not all inclusive. Hence, there could be a variety of other display control signals provided and their use would be within the spirit and scope of the present invention. The raster display controls signals can be for display devices such as CRT monitor, liquid crystal display, electroluminant display, and plasma display. Also the video memory can be static RAM, dynamic RAM, or video RAM.

It is understood that the above described embodiment is merely illustrative of but a small number of the many possible specific embodiments which can represent applications of the principles of the present invention. Numerous and various other arrangements can be readily devised in accordance with these principles by one of ordinary skill in the art without departing from the scope of the present invention. The scope of the present invention is limited only by the following claims.

We claim:

1. An asynchronous video system, the system including a memory clock and a video clock, the system comprising:

a video memory containing pixel data;

means, coupled to the memory clock, for fetching pixel data within the video memory;

means coupled to the memory clock for providing a plurality of raster display control signals;

FIFO means for receiving the pixel data from the video memory and the raster display control signals from the providing means responsive to a signal from the memory clock such that the raster display control signals and pixel data are in a predetermined relationship defined by the memory clock; and means for processing the display control signals and pixel data from the FIFO means responsive to a signal from the video clock.

2. The system of claim 1 in which the providing means is a raster display control circuit.

3. The system of claim 2 in which the providing means provides control signals for a raster display device in which the raster display device includes a CRT monitor.

4. The system of claim 2 in which the providing means provides control signals for a raster display device in which the raster display device includes a flat panel display device.

5. The system of claim 2 in which the providing means provides control signals for a raster display device in which the raster display device includes a liquid crystal display device (LCD).

6. The system of claim 2 in which the providing means provides control signals for a raster display device in which the raster display device includes an electroluminant display device (ELD).

7. The system of claim 2 in which the providing means provides control signals for a raster display device in which the raster display device includes a plasma display device.

8. The system of claim 2 in which the raster display control circuit provides advanced control signals.

9. The system of claim 8 in which the advanced control signals comprise horizontal synchronization (HSYNC), vertical synchronization (VSYNC), BLANK, display enable (DISPEN), cursor on (CURSON) signals.

10. The system of claim 2 in which the synchronization between the memory control and the display control is achieved by locking the two circuits with the memory clock.

11. The system of claim 1 in which the providing means is a CRT control circuit.

12. The system of claim 1 in which the processing means comprises a video process circuit.

13. The system of claim 12 in which the video process circuit provides at an output responsive to a video clock signal pixel data and raster display control signals.

14. The system of claim 12 in which the video process circuit provides at output responsive to a video clock signal pixel data, HSYNC control signal, VSYNC control signal, BLANK control signal, DISPEN control signal and CURSON control signal.

15. The system of claim 1 in which the pixel data fetching means is a video memory control circuit.

16. The system of claim 15 in which the providing means lacks a synchronization circuit between the video memory control circuit and the display control circuit.

17. The system of claim 15 in which the synchronization between the memory control and the display control is achieved by locking the two circuits with the memory clock.

18. The system of claim 1 in which the providing means is a flat panel control circuit.

19. The system of claim 18 in which the providing means is for split panel control giving one line of data to each section one at a time.

20. An asynchronous video system, the system including a memory clock and a video clock, the system comprising:

a video memory containing pixel data;

memory control circuit coupled to the memory clock for fetching pixel data within the video memory;

raster display control circuit coupled to the memory clock for providing advanced video control signals, the advanced control signals including HYSNC, VSYNC, BLANK, DISPEN, CURSON control signals and other raster display control signals for a flat panel display device;

a FIFO circuit for receiving the pixel data from the memory control circuit and for receiving the advanced display control signals from the raster display control circuit and responsive to a signal from the memory clock providing the pixel data and advanced control signals at an output of the FIFO circuit in a predetermined relationship defined by the memory clock; and a video process circuit for processing the advanced display control signals and the pixel data from the FIFO circuit responsive to a signal from the video clock.

21. An asynchronous video system for placing pixel data on a display comprising:

a memory clock defining a series of memory cycles;

a video memory containing pixel data;

a memory control circuit, responsive to said memory clock, for causing pixel data to be output from said video memory synchronously with said memory clock;

a display control circuit, responsive to said memory clock, for generating a plurality of raster display control signals synchronous with said memory clock;

a first-in-first-out (FIFO) circuit, responsive to said memory clock, for receiving said pixel data from said video memory and said plurality of raster display control signals from said display control circuit synchronously with said memory clock;

a video clock defining a series of video cycles; and a video processing circuit, coupled to said FIFO and responsive to said video clock, for receiving said pixel data and said plurality of raster display control signals from said FIFO and outputting said pixel data and said plurality of raster display control signals to said display synchronously with said video clock.

22. A method for placing pixel data stored in a video memory on a display comprising:

generating a series of memory cycles;

causing pixel data to be output from said memory synchronously with said memory cycles;

generating a plurality of raster display control signals synchronously with said memory cycles;

receiving said pixel data from said video memory and said plurality of raster display control signals from said display control circuit synchronously with said memory cycles;

generating a series of video cycles;

storing said pixel data and said plurality of raster display control signals; and outputting said pixel data and said plurality of raster display control signals to said display synchronously with said video cycles.

* * * * *